United States Patent
Kim et al.

(10) Patent No.: US 9,382,384 B2
(45) Date of Patent: Jul. 5, 2016

(54) μ-POLYOXO CROSSLINKED PHTHALOCYANINE COMPOUND, PREPARING METHOD THEREOF, AND NEAR INFRARED RAY ABSORBING AND REFLECTING COMPOSITION USING THE SAME

(71) Applicant: NANO CMS Co., Ltd., Cheonan-si (KR)

(72) Inventors: Shi Surk Kim, Cheonan-si (KR); In Ja Lee, Cheonan-si (KR); Je Young Park, Seoul (KR); Woo Sung Lim, Daegu (KR)

(73) Assignee: Nano CMS Co., Ltd. (KR)

( * ) Notice: Subject to any disclaimer, the term of this patent is extended or adjusted under 35 U.S.C. 154(b) by 195 days.

(21) Appl. No.: 14/166,114

(22) Filed: Jan. 28, 2014

(65) Prior Publication Data

US 2015/0183938 A1 Jul. 2, 2015

(30) Foreign Application Priority Data

Dec. 27, 2013 (KR) ........................ 10-2013-0165804

(51) Int. Cl.
| | |
|---|---|
| *F21V 9/04* | (2006.01) |
| *F21V 9/06* | (2006.01) |
| G02B 5/22 | (2006.01) |
| *G02B 5/26* | (2006.01) |
| *C09B 47/04* | (2006.01) |
| *C08G 79/00* | (2006.01) |

(Continued)

(52) U.S. Cl.
CPC .............. *C08G 79/00* (2013.01); *C09B 47/045* (2013.01); *C09B 69/108* (2013.01); *G02B 1/10* (2013.01); *G02B 5/0841* (2013.01); *G02B 5/208* (2013.01); *G02B 5/223* (2013.01); *G03G 5/0696* (2013.01); *G11B 7/248* (2013.01)

(58) Field of Classification Search
USPC ........ 106/31.13; 252/587; 359/359; 528/422; 540/123, 122, 139, 140
See application file for complete search history.

(56) References Cited

U.S. PATENT DOCUMENTS

| | | | |
|---|---|---|---|
| 4,769,307 A | 9/1988 | Ozawa et al. | |
| 5,229,507 A | 7/1993 | Baumann et al. | |

(Continued)

FOREIGN PATENT DOCUMENTS

| | | |
|---|---|---|
| JP | 154888 | 7/1986 |
| JP | 197280 | 9/1986 |

(Continued)

OTHER PUBLICATIONS

Brent J. Hamstra, Beisong Cheng, Mary K. Ellison, and W. Robert Scheidt, Molybdenum(V) on an Oxide String. Synthesis and Structure of the Novel Linear Trinuclear Complex {[MoO(TPP)][O—Mo(TPP)-O][MoO(TPP)]}ClO4, Inorg. Chem. 1999, 38, 3554-3561, © 1999 American Chemical Society.*

*Primary Examiner* — Bijan Ahvazi
(74) *Attorney, Agent, or Firm* — Basch & Nickerson LLP

(57) ABSTRACT

Disclosed herein are a μ-polyoxo crosslinked phthalocyanine compound, a preparing method thereof, and a near infrared ray absorbing and reflecting composition using the same, and more particularly, a μ-polyoxo crosslinked phthalocyanine compound having high absorption at a wavelength of 800 to 950 nm and high reflectance at a wavelength of 1200 nm or more, a preparing method of a μ-polyoxy crosslinked phthalocyanine compound simultaneously having near infrared ray absorption and reflection properties as described above, and a near infrared ray absorbing and reflecting composition using the μ-polyoxo crosslinked phthalocyanine compound. According to the exemplary embodiment of the present invention, there is provided a μ-polyoxo crosslinked molybdenum phthalocyanine compound capable of absorbing and reflecting near infrared ray at the same time.

12 Claims, 11 Drawing Sheets

(51) Int. Cl.
*C09B 69/10* (2006.01)
*G03G 5/06* (2006.01)
*G11B 7/248* (2006.01)
*G02B 1/10* (2015.01)
*G02B 5/08* (2006.01)
*G02B 5/20* (2006.01)
*C09B 62/00* (2006.01)
*C09B 67/00* (2006.01)

(56) References Cited

U.S. PATENT DOCUMENTS

| | | | | |
|---|---|---|---|---|
| 5,456,998 A | * | 10/1995 | Burt | G03G 5/0696 430/58.8 |
| 5,466,796 A | * | 11/1995 | Burt | C07D 519/00 540/122 |
| 5,493,016 A | * | 2/1996 | Burt | C07D 519/00 540/139 |
| 5,641,879 A | | 6/1997 | Wolleb et al. | |
| 5,663,326 A | | 9/1997 | Wolleb et al. | |
| 2004/0146793 A1 | * | 7/2004 | Yamasaki | C07D 487/22 430/59.4 |
| 2006/0020129 A1 | * | 1/2006 | Takaki | C09B 47/08 540/140 |

FOREIGN PATENT DOCUMENTS

| | | |
|---|---|---|
| JP | 246091 | 11/1986 |
| JP | 39388 | 2/1988 |
| JP | 62878 | 3/1991 |
| KR | 200396052 | 12/2003 |
| KR | 20052083 | 3/2005 |

\* cited by examiner

μ-POLYOXO CROSSLINKED PHTHALOCYANINE COMPOUND, PREPARING METHOD THEREOF, AND NEAR INFRARED RAY ABSORBING AND REFLECTING COMPOSITION USING THE SAME

CROSS REFERENCE TO RELATED APPLICATION

This application claims the benefit of Korean Patent Application No. 10-2013-0165804, filed on Dec. 27, 2013, entitled "μ-Polyoxo Crosslinked Phthalocyanine Compound, Preparing Method Thereof, and Near Infrared Ray Absorbing and Reflecting Composition Using the Same", which is hereby incorporated by reference in its entirety into this application.

BACKGROUND OF THE INVENTION

1. Technical Field

The present invention relates to a μ-polyoxo crosslinked phthalocyanine compound, a preparing method thereof, and a near infrared ray absorbing and reflecting composition using the same, and more particularly, to a μ-polyoxo crosslinked phthalocyanine compound having high absorption at a wavelength of 800 to 950 nm and high reflectance at a wavelength of 1200 nm or more, a preparing method of a μ-polyoxo crosslinked phthalocyanine compound simultaneously having these near infrared ray absorption and reflection properties, and a near infrared ray absorbing and reflecting composition using the μ-polyoxo crosslinked phthalocyanine compound.

2. Description of the Related Art

The present invention relates to a novel μ-polyoxo crosslinked phthalocyanine compound and applications of a near infrared ray absorbing and reflecting composition using the same. An organic dye or pigment according to the related art has been widely used as a colorant, and particularly, some of the phthalocyanine based dyes have been widely used in an optical information recording medium field. These recording media in which data written once may be repeatedly read are referred to as write once read many (abbreviated as "WORM"). As an example of a disk format using this technology, a compact disk recordable, or so-called CD-R has been known at "Optical Data Storage 1989", Technical Digest Series, Vol. 1 45 (1989).

Among all of the organic dyes for optical recording medium, a phthalocyanine compound is one of the most important categories due to high absorption in a near infrared ray range (700 to 900 nm). As compared to other organic dyes such as cyanine, the phthalocyanine dye has more excellent light resistance, temperature resistance, and moisture resistance.

Phthalocyanine compounds were disclosed as a constituent component of a record layer of an optical recording medium in the initial documents such as JP-A 154888 (1986), 197280 (1986), 246091 (1986), U.S. Pat. No. 4,769,307 (1987), and JP-A 39388 (1988). However, the phthalocyanine compounds of the above-mentioned documents may not be considered as a suitable material for an optical recording medium in view of sensitivity, solubility, recording performance, and other related properties.

In order to overcome the above-mentioned disadvantages associated with the phthalocyanine compound used as an optical recording material, phthalocyanine compounds having a larger substituent (having a larger steric hindrance effect) in a phenyl ring were provided in JP-A 62878 (1991). However, these materials were not suitable for a recording material. A phenyl-substituted phthalocyanine (also, referred to as naphthalocyanine) dye was suggested in U.S. Pat. No. 5,229,507 (1993), but solubility of this dye was insufficient. The dye sometimes precipitates during spin-coating under predetermined process conditions.

A solubility issue was described in U.S. Pat. No. 5,641,879 (1997) by introducing various large substituents in a phenyl ring of phthalocyanine. However, inappropriate reflectance was observed. An effect of an isomer on solubility was studied in U.S. Pat. No. 5,663,326. It was reported that in order to obtain the desired solubility, a composition of two isomers having a pair of alkoxy substituents facing each other should be 80% or more. It is obviously unpractical to accurately control the composition of the isomer for quality management in preparing process of a dye.

A phthalocyanine compound in which a metal is introduced as a central atom has been disclosed in Korean Patent Laid-Open Publication Nos. 2003-96052 and 2005-20832, but it was confirmed that in the above-mentioned phthalocyanine compound, which is a single metal phthalocyanine compound or oxo crosslinked a different kind—metal phthalocyanine compound, mostly, near infrared ray absorption only at 800 nm or less was low, and properties such as light fastness, thermal stability, dispersibility, chemical resistance, solvent resistance, and the like, were weak. Further, in the case of mixing the single metal phthalocyanine compound or oxo crosslinked a different kind—metal phthalocyanine compound with a generally used color pigment and using the mixture, there is a disadvantage in that since it is difficult to clearly distinguish absorption spectra of near infrared ray absorber and the color pigment from each other due to an overlapping phenomenon of an absorption wavelength, various colors were not obtained. Furthermore, in the case of using carbon black or graphite, only a dark or black color was provided, such that it was difficult to exhibit various colors. Therefore, there is a disadvantage in that forgery or falsification may be easily performed.

SUMMARY OF THE INVENTION

An object of the present invention is to provide a μ-polyoxo crosslinked phthalocyanine compound simultaneously having near infrared ray absorption and reflection properties.

Another object of the present invention is to provide a preparing method of μ-polyoxo crosslinked phthalocyanine compound.

Still another object of the present invention is to provide a near infrared ray absorbing and reflecting composition using the μ-polyoxo crosslinked phthalocyanine compound.

According to an exemplary embodiment of the present invention, there is provided a μ-polyoxo crosslinked molybdenum phthalocyanine compound including: at least one non-metal phthalocyanine, wherein it has a structure represented by following Chemical Formula I;

[Chemical Formula I]

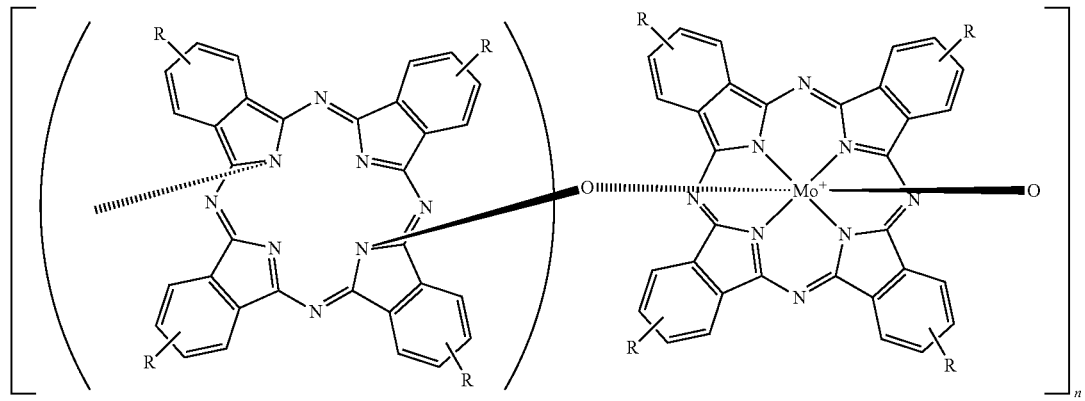

where,
R is selectively substituted with a substituent independently selected from hydrogen, halogen, hydroxyl, amino, sulfonyl, hydroxysulfonyl, aminosulfonyl, ($C_1$-$C_5$)alkyl, $SR^{17}$, $OR^{18}$, and $NHR^{19}$; $R^{17}$ to $R^{19}$ are each independently ($C_1$-$C_5$)alkyl, ($C_1$-$C_5$)alkoxy, or phenyl selectively substituted with a substituent independently selected from halogen, hydroxyl, amino, sulfonyl, hydroxysulfonyl, aminosulfonyl, ($C_1$-$C_5$)alkyl, and ($C_1$-$C_5$)alkoxy; x is a rational number of 0.001 to 1; and n is an integer of 1 to 20.

The μ-polyoxo crosslinked molybdenum phthalocyanine compound may absorb near infrared ray at a wavelength of 800 to 950 nm and reflect near infrared ray at a wavelength of 1200 nm or more.

A difference between absorption of near infrared ray at a wavelength of 800 to 950 nm and reflectance of near infrared ray at a wavelength of 1200 nm or more may be 30% or more.

According to another exemplary embodiment of the present invention, there is provided a preparing method of the μ-polyoxo crosslinked molybdenum phthalocyanine compound as described above, the preparing method comprising: oxo crosslinking at least one non-metal phthalocyanine and phthalocyanine substituted with a molybdenum metal is to each other.

According to another exemplary embodiment of the present invention, there is provided a μ-polyoxo crosslinked molybdenum phthalocyanine compound including: at least One different kind—metal phthalocyanine, wherein it has a structure represented by following Chemical Formula II;

[Chemical Formula II]

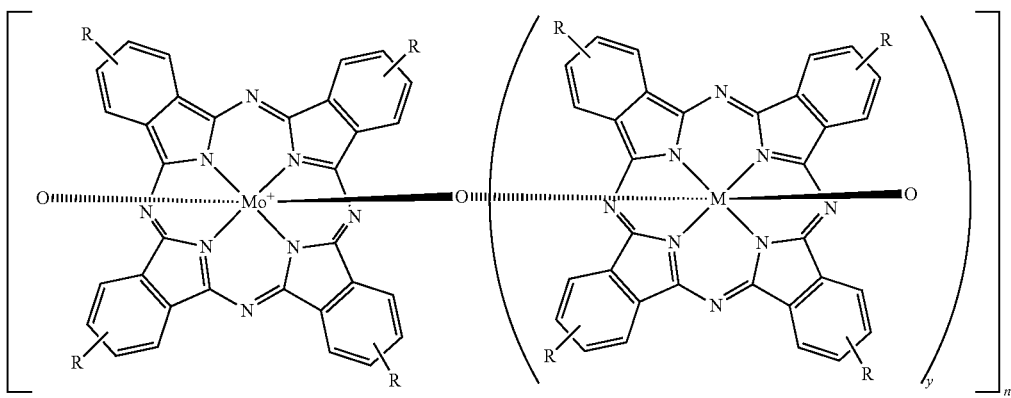

where, R is selectively substituted with a substituent independently selected from hydrogen, halogen, hydroxyl, amino, sulfonyl, hydroxysulfonyl, aminosulfonyl, ($C_1$-$C_5$) alkyl, $SR^{17}$, $OR^{18}$, and $NHR^{19}$; $R^{17}$ to $R^{19}$ are each independently ($C_1$-$C_5$)alkyl, ($C_1$-$C_5$)alkoxy, or phenyl selectively substituted with a substituent independently selected from halogen, hydroxyl, amino, sulfonyl, hydroxysulfonyl, aminosulfonyl, ($C_1$-$C_5$)alkyl, and ($C_1$-$C_5$)alkoxy; M is nickel, lithium, magnesium, silicon, or aluminum capable of having a valence of 1 to 4, an oxide thereof, or a halide thereof;
y is a rational number of 0.001 to 2; and n is an integer of 1 to 20.

The μ-polyoxo crosslinked molybdenum phthalocyanine compound may absorb near infrared ray at a wavelength of 800 to 950 nm and reflect near infrared ray at a wavelength of 1200 nm or more.

A difference between absorption of near infrared ray at a wavelength of 800 to 950 nm and reflectance of near infrared ray at a wavelength of 1200 nm or more may be 30% or more.

According to another exemplary embodiment of the present invention, there is provided a preparing method of the μ-polyoxo crosslinked molybdenum phthalocyanine compound as described above, the preparing method including: oxo crosslinking at least one different kind—metal phthalocyanine and phthalocyanine substituted with a molybdenum metal to each other, wherein the different kind—metal is nickel, lithium, magnesium, silicon, or aluminum.

According to another exemplary embodiment of the present invention, there is provided a near infrared ray absorbing and reflecting composition containing: the μ-polyoxo crosslinked molybdenum phthalocyanine compound as described above; and at least one binder selected from an acrylic polymer, an alkyd resin, polyamide, polyurethane, polyester, polyethylene terephthalate, polycarbonate, and polypropylene.

According to another exemplary embodiment of the present invention, there is provided an optical device including: a recording layer containing the compound or the composition as described above, absorbing near infrared ray at a wavelength of 800 to 950 nm, and reflecting near infrared ray at a wavelength of 1200 nm or more; and a reflecting layer on the recording layer.

DESCRIPTION OF THE EXEMPLARY EMBODIMENTS

Figure 1:
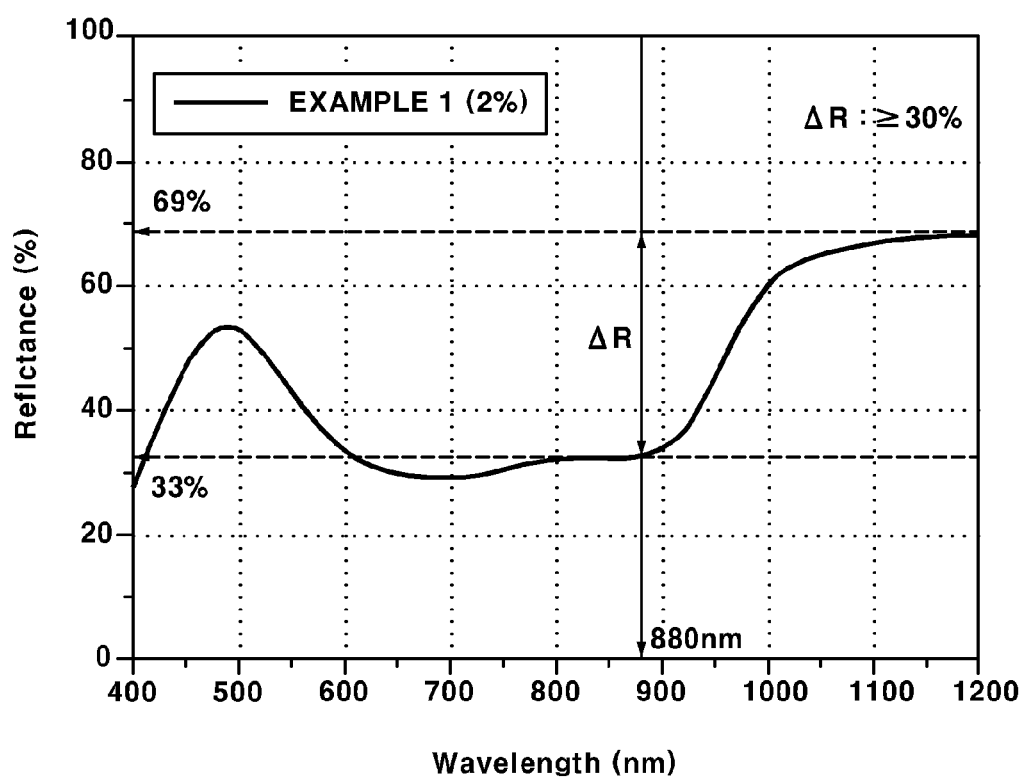
FIGS. 1 and 2 show measurement results of near infrared ray reflectance of a μ-polyoxo crosslinked molybdenum phthalocyanine compound according to Examples of the present invention.

For convenience, specific terms will be defined in the present specification in order to allow the present invention to be easily understood. Unless otherwise defined, technical terms and scientific terms used in the present specification have the general meaning understood by those skilled in the art to which the present invention pertains. In addition, unless the context clearly indicates otherwise, it should be understood that a term in singular form includes the term in plural form, and a term in plural form includes the term in singular form.

As used herein, the term "alkyl" means saturated aliphatic radicals including straight chain alkyl groups, branched chain alkyl groups, cycloalkyl (alicyclic) groups, alkyl-substituted cycloalkyl groups, cycloalkyl-substituted alkyl groups. The term "alkyl" may include alkyl groups further including, an oxygen, nitrogen, sulfur, or phosphorus atom, that is, alkyl groups in which at least one carbon in a hydrocarbon main chain is substituted with, for example, an oxygen, nitrogen, sulfur, or phosphorus atom. In preferable embodiments, the straight or branched chain alkyl has at most 20 carbon atoms (for example, ($C_1$-$C_{20}$) straight chain or ($C_3$-$C_{20}$) branched chain), preferably at most 15 carbon atoms, more preferably at most 10 carbon atoms, and most preferably at most 8 carbon atoms in a main chain thereof. Similarly, cycloalkyl has preferably 3 to 10 carbon atoms, more preferably, 3 to 7 carbon atoms in a ring structure thereof.

In addition, the term "alkyl" is intended to include both of unsubstituted alkyl and substituted alkyl meaning an alkyl moiety having a substituent replacing hydrogen on at least one carbon in a hydrocarbon main chain. An example of the substituent may include halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkylamino, dialkylamino, arylamino, diarylamino, and alkylarylamino), acylamino (including alkylcarbonylamino, arylcarbonylamino, carbamoyl, and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, alkylaryl, or an aromatic or heteroaromatic moiety. It may be understood by those skilled in the art that a substituted moiety on the hydrocarbon chain may be spontaneously substituted in a suitable case. Cycloalkyl may be further substituted with, for example, the above-mentioned substituent. An alkylaryl moiety is an alkyl substituted with an aryl (for example, phenylmethyl(benzyl). In addition, the term "alkyl" includes unsaturated aliphatic group capable of being substituted with the above-mentioned alkyl and having a similar length and may include at least one double or triple bond, respectively.

Unless the number of carbon atoms is described otherwise, a lower alkyl group may mean the above-defined alkyl group having 1 to 10, preferably 1 to 6, and more preferably 1 to 4 carbon atoms in a main straight or branched chain structure thereof. An is example of the lower alkyl group includes methyl, ethyl, n-propyl, i-propyl, tert-butyl, hexyl, heptyl, octyl, and the like. In preferable embodiments, the term "lower alkyl" includes straight chain alkyl having 4 or less carbon atoms in a main chain thereof, for example, ($C_1$-$C_4$) alkyl.

As used herein, the term "alkoxyalkyl, polyaminoalkyl, and thioalkoxyalkyl" means the above-mentioned alkyl groups further including an oxygen, nitrogen, or sulfur atom, that is, alkyl groups in which at least one carbon in a hydrocarbon main chain is substituted with, for example, an oxygen, nitrogen, or sulfur atom.

As used herein, the term "aryl" means a radical of aryl groups including 5- and 6-membered single-ring aromatic groups capable of having 0 to 4 hetero atoms, for example, benzene, pyrrole, furan, thiophene, imidazole, benzoxazole, benzothiazole, triazole, tetrazole, pyrazole, pyridine, pyrazine, pyridazine, pyrimidine, and the like. In addition, the aryl group includes polycyclic fused aromatic groups such as naphthyl, quinolyl, indolyl, and the like. Those aryl groups having a hetero atom in the ring structure may also be referred to as "aryl heterocycles", "heteroaryls" or "heteroaromatics". The aromatic ring may be substituted at one or more ring positions with the above-mentioned substituent, for example, halogen, hydroxyl, alkoxy, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, phosphate, phosphonato, phosphinato, cyano, amino (including alkylamino, dialkylamino, arylamino, diarylamino, and alkylarylamino), acylamino (including alkylcarbonylamino, arylcarbonylamino, carbamoyl, and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, alkylaryl, or an aromatic or heteroaromatic moiety. Further, the aryl group may be fused or crosslinked with an alicyclic or heterocyclic ring which is not aromatic to thereby form a polycycle (for example, tetralin).

As used herein, the term "associated with" means a condition at which a chemical, a compound or a moiety thereof and a binding pocket or binding site of protein are closely posinine compound including at least one non-metal phthalocyanine and having a structure represented by the following Chemical Formula I.

[Chemical Formula I]

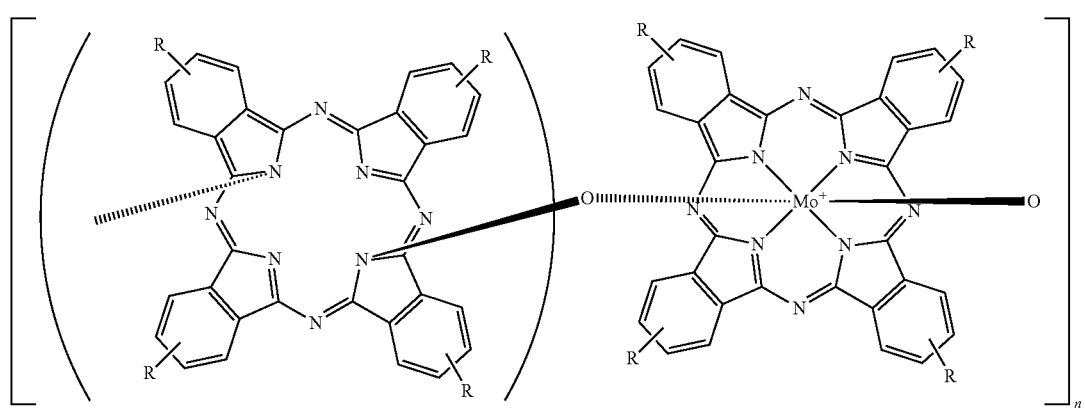

tioned. The bond may be a non-covalent or covalent bond (energetically preferred by a hydrogen bond or van der Waals or electrostatic interaction).

As used herein, the term "haloalkyl" is intended to include the above-mentioned alkyl group mono-, di-, or poly-substituted with halogen, for example, fluoromethyl or trifluoromethyl.

As used herein, the term "halogen" means —F, —Cl, —Br, or —I.

As used herein, the term "hydroxyl" means —OH.

As used herein, the term "hetero atom" means an atom of an arbitrary atom except for carbon or hydrogen. Preferable hetero atoms are nitrogen, oxygen, sulfur, and phosphorus.

As used herein, the term "selectively substituted" is intended to include unsubstituted or a group substituted with at least one suitable group except for hydrogen at one or more possible positions (may be equal to or different from each other), generally, 1, 2, 3, 4, or 5 positions.

An example of the selective substituent includes a carbocyclic and heterocyclic group as well as hydroxyl, halogen, cyano, nitro, ($C_1$-$C_8$)alkyl, ($C_2$-$C_8$)alkenyl, ($C_2$-$C_8$)alkynyl, ($C_1$-$C_8$)alkoxy, ($C_2$-$C_8$)alkylether, ($C_3$-$C_8$)alkanone, ($C_1$-$C_8$)alkylthio, amino, mono- or di-(($C_1$-$C_8$)alkyl)amino, halo($C_1$-$C_8$)alkyl, halo($C_1$-$C_8$)alkoxy, ($C_1$-$C_8$)alkanoyl, ($C_2$-$C_8$)alkanoyloxy, ($C_1$-$C_8$)alkoxycarbonyl, —COOH, —CONH$_2$, mono- or di-(($C_1$-$C_8$)alkyl)aminocarbonyl, —SO$_2$NH$_2$ and/or mono- or di-(($C_1$-$C_8$)alkyl)sulfonamide.

In addition, selective substitution is described by a phase "substituted by 0 to X substituents", wherein X is the maximum number of possible substituent. A certain selectively substituted group is substituted with 0 to 2, 3 or 4 independently selected substituents (that is, the group is not substituted, or the number of substituents used for substitution is the above-mentioned maximum value or less).

Here, a description of a chemical functional group list in various arbitrary definitions includes various definitions thereof as an arbitrary single functional group of a combination of the described functional groups. Here, description of various embodiments includes embodiments as a single embodiment, or another embodiment, or a combination thereof.

According to an aspect of the present invention, there is provided a μ-polyoxo crosslinked molybdenum phthalocya- Where, R is selectively substituted with a substituent independently selected from hydrogen, halogen, hydroxyl, amino, sulfonyl, hydroxysulfonyl, aminosulfonyl, ($C_1$-$C_5$) alkyl, $SR^{17}$, $OR^{18}$, and $NHR^{19}$; $R^{17}$ to $R^{19}$ are each independently ($C_1$-$C_5$)alkyl, ($C_1$-$C_5$)alkoxy, or phenyl selectively substituted with a substituent independently selected from halogen, hydroxyl, amino, sulfonyl, hydroxysulfonyl, aminosulfonyl, ($C_1$-$C_5$)alkyl, and ($C_1$-$C_5$)alkoxy; x is a rational number of 0.001 to 1; and n is an integer of 1 to 20.

The μ-polyoxo crosslinked molybdenum phthalocyanine compound having the structure represented by the following Chemical Formula I is a polymer compound in which at least one non-metal phthalocyanine (unsubstituted phthalocyanine) and at least one molybdenum phthalocyanine (phthalocyanine in which H covalently bonded to two nitrogen atoms existing at the center is substituted with a molybdenum metal) are crosslinked to each other via an oxo group.

Here, non-metal phthalocyanine may be defined as unsubstituted phthalocyanine in which H covalently bonded to two nitrogen atoms existing at the center is not substituted with a metal (in Chemical Formula I, molybdenum). However, non-metal phthalocyanine defined as unsubstituted phthalocyanine does not means that H is necessarily bonded to two nitrogen atoms existing at the center.

In Chemical Formula I, the number of repeating unit of non-metal phthalocyanine is defined as x, and the number of repeating unit of μ-polyoxo crosslinked molybdenum phthalocyanine compound in which non-metal phthalocyanine and molybdenum phthalocyanine are oxo crosslinked to each other is defined as n.

In an exemplary embodiment, the μ-polyoxo crosslinked molybdenum phthalocyanine compound may absorb near infrared ray at a wavelength of 800 to 950 nm and reflect near infrared ray at a wavelength of 1200 nm or more.

In an exemplary embodiment, a difference between absorption of near infrared ray at a wavelength of 800 to 950 nm and reflectance of near infrared ray at a wavelength of 1200 nm or more may be 30% or more.

According to another aspect of the present invention, there is provided a preparing method of a μ-polyoxo crosslinked molybdenum phthalocyanine compound including oxo crosslinking at least one non-metal phthalocyanine and phthalocyanine substituted with the molybdenum metal to each other.

According to another aspect of the present invention, there is provided a μ-polyoxo crosslinked molybdenum phthalocyanine compound including at least one different kind—metal phthalocyanine and having a structure represented by the following Chemical Formula II.

According to another aspect of the present invention, there is provided a near infrared ray absorbing and reflecting composition containing: the μ-polyoxo crosslinked molybdenum phthalocyanine compound; and at least one binder selected from an acrylic polymer, an alkyd resin, polyamide, polyure-

[Chemical Formula II]

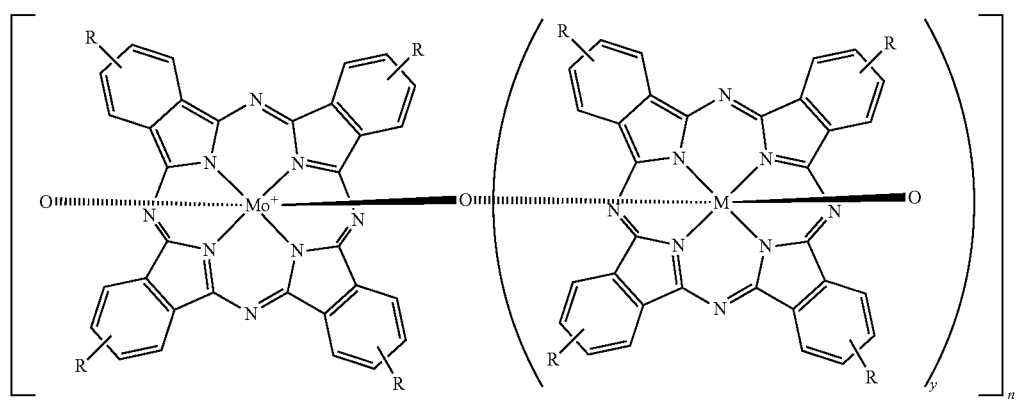

Where, R is selectively substituted with a substituent independently selected from hydrogen, halogen, hydroxyl, amino, sulfonyl, hydroxysulfonyl, aminosulfonyl, ($C_1$-$C_5$) alkyl, $SR^{17}$, $OR^{18}$, and $NHR^{19}$; $R^{17}$ to $R^{19}$ are each independently ($C_1$-$C_5$)alkyl, ($C_1$-$C_5$)alkoxy, or phenyl selectively substituted with a substituent independently selected from halogen, hydroxyl, amino, sulfonyl, hydroxysulfonyl, aminosulfonyl, ($C_1$-$C_5$)alkyl, and ($C_1$-$C_5$)alkoxy; M is nickel, lithium, magnesium, silicon, or aluminum, which has a valence of 1 to 4, an oxide thereof, or a halide thereof, y is a rational number of 0.001 to 2; and n is an integer of 1 to 20.

The μ-polyoxo crosslinked molybdenum phthalocyanine compound having the structure represented by the Chemical Formula II is a polymer compound in which at least one molybdenum phthalocyanine (phthalocyanine in which H covalently bonded to two nitrogen atoms existing at the center is substituted with a molybdenum metal) and at least one metal phthalocyanine substituted with a different kind—metal are crosslinked to each other via an oxo group.

Here, the different kind—metal may be independently selected from nickel, lithium, magnesium, silicon, and aluminum, and the different kind—metal in phthalocyanine may be present as a metal salt, metal oxide, or metal halide.

In Chemical Formula II, the number of repeating unit of phthalocyanine substituted with the metal is defined as y, and the number of repeating unit of μ-polyoxo crosslinked molybdenum phthalocyanine compound in which different kind—metal phthalocyanine and molybdenum phthalocyanine are oxo crosslinked to each other is defined as n.

In an exemplary embodiment, the μ-polyoxo crosslinked molybdenum phthalocyanine compound may absorb near infrared at a wavelength of 800 to 950 nm and reflect near infrared ray at a wavelength of 1200 nm or more.

In an exemplary embodiment, a difference between absorption of near infrared ray at a wavelength of 800 to 950 nm and reflectance of near infrared ray at a wavelength of 1200 nm or more may be 30% or more.

According to another aspect of the present invention, there is provided a preparing method including oxo crosslinking at least one different kind—metal phthalocyanine and phthalocyanine substituted with the molybdenum metal to each other, wherein the 7 different kind—metal is nickel, lithium, magnesium, silicon, or aluminum.

thane, polyester, polyethylene terephthalate, polycarbonate, and polypropylene.

According to another aspect of the present invention, there is provided an optical recording medium including a printing layer containing the compound or the composition, absorbing near infrared ray at a wavelength of 800 to 950 nm, and reflecting near infrared ray at a wavelength of 1200 nm or more; and a reflecting layer on the recording layer. The compound or composition, which is a composition in an ink form, may be used as a data carrier such as a check card, a credit card, or the like, and used to mark various optical recording media having a security function such as deeds, for example, an identification card, bank bills, a certificate, or the like.

Hereinafter, the present invention will be described in detail through the Examples. However, this example is only to illustrate the present invention and is not to be construed as limiting a scope of the present invention.

EXAMPLE

Properties of a μ-polyoxo crosslinked molybdenum phthalocyanine compound in which non-metal or different kind—metal phthalocyanine is included were tested, wherein the compound (Chemical Formula I or II) was prepared using phthalic anhydride having a structure represented by the following Chemical Formula III.

[Chemical Formula III]

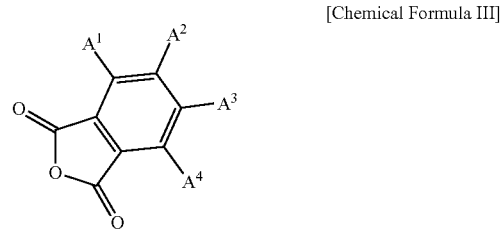

Where, $A^1$ to $A^4$ may be each selectively substituted with a substituent independently selected from hydrogen, halogen, hydroxyl, amino, sulfonyl, hydroxysulfonyl, aminosulfonyl, ($C_1$-$C_5$)alkyl, $SR^{17}$, $OR^{18}$, and $NHR^{19}$ according to the desired μ-polyoxo crosslinked molybdenum phthalocyanine compound, and $R^{17}$ to $R^{19}$ may be each independently ($C_1$-$C_5$)alkyl, ($C_1$-$C_5$)alkoxy, or phenyl selectively substituted with a substituent independently selected from halogen, hydroxyl, amino, sulfonyl, hydroxysulfonyl, aminosulfonyl, ($C_1$-$C_5$)alkyl, and ($C_1$-$C_5$)alkoxy. For example, in Examples 1 to 4, phthalic anhydride corresponding to the case in which $A^1$ to $A^4$ are hydrogen was used.

Since, in the case of mixing phthalic anhydride with water, reactivity of phthalic anhydride is significantly decreased as the phthalic anhydride is hydrolyzed, phthalic anhydride was used under anhydrous conditions, and as urea, a generally used product was used. In addition, the reaction was carried out using an n-alkylbenzene having a low polarity and high boiling point as a reaction solvent or without using a solvent.

Near infrared ray absorption and reflectance of the obtained compound were measured. In this case, absorption/reflectance was measured 5 times using UV-3101 spectrophotometer (Shimadzu) and D2 lamp (190-360 nm) and tungsten lamp (360-3200 nm) as light sources in a measuring range of 400 to 1200 nm at an integrating sphere slit width of 20 nm under sensor type conditions, and an accumulated average value of the measured values was calculated.

Example 1

A μ-polyoxo crosslinked molybdenum phthalocyanine compound (Chemical Formula I) including non-metal phthalocyanine according to the present invention was prepared. To this end, 51.8 g of phthalic anhydride (0.35 mol), 105.1 g of urea (1.75 mol), 21.15 g of lithium chloride (0.5 mol), and 0.52 g of ammonium molybdate (0.0004 mol) were put into a 1 L three-neck round bottom flask, and stirred in alkyl benzene or without a solvent, and heated, followed by reaction at 175 to 200 for 3 hours. Thereafter, the reactant was cooled by putting 2 L of water thereinto, filtered, and treated with 1 L of 0.35 to 0.5 wt % hydrochloric acid solution and 2 L of 2.5 to 3.0 wt % sodium hydroxide solution, followed by washing. The precipitated metal complex was separated and dried. Results of element analysis of the obtained metal complex were shown in the following Table 1, and near infrared ray absorption and reflectance thereof were shown in FIG. 1.

Among numerical values indicating degrees of absorption or reflection, respectively, reflectance was 33% at 880 nm in near infrared region and 69% at 1200 nm, and a difference in reflectance (ΔR %) was 36%.

TABLE 1

|  | C | H | N | O | Mo | Li |
|---|---|---|---|---|---|---|
| Calculated value | 66.6 | 2.9 | 19.4 | 2.8 | 8.3 | 0 |
| Measured value | 66.4 | 2.8 | 20.1 | 2.5 | 7.1 | 0.00259 |

Example 2

Figure 2:
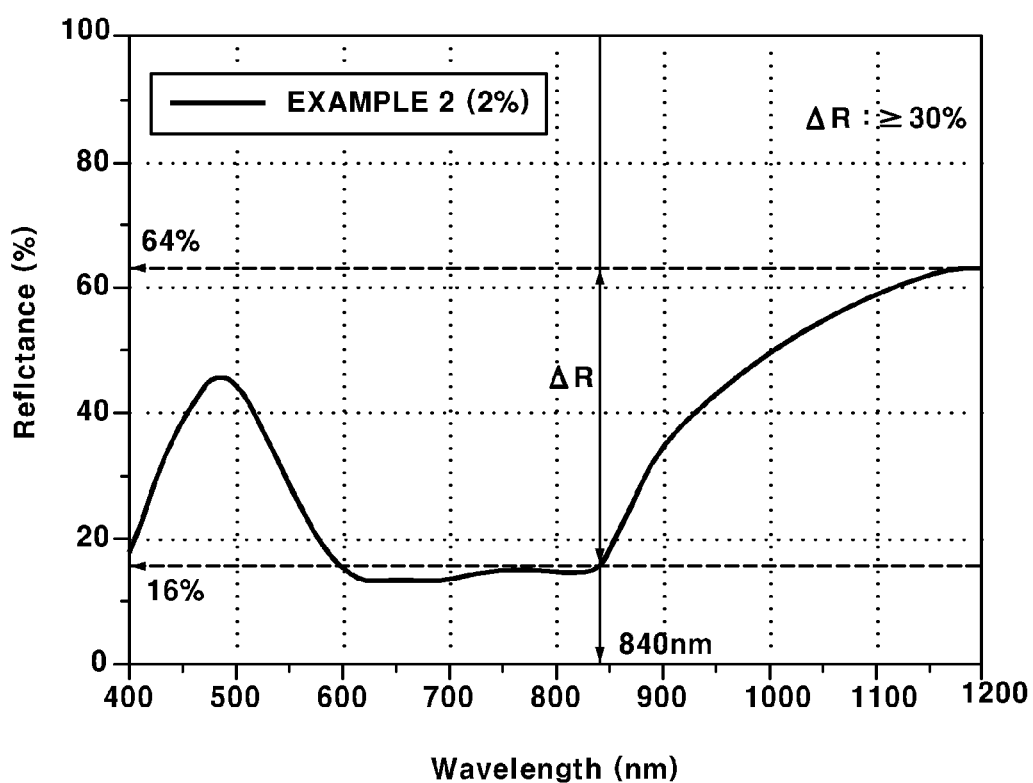

A μ-polyoxo crosslinked molybdenum phthalocyanine compound (Chemical Formula II) including a magnesium metal phthalocyanine compound according to the present invention was prepared. To this end, 51.8 g of phthalic anhydride (0.35 mol), 168.17 g of urea (2.8 mol), 71.16 g of magnesium chloride (0.35 mol), and 0.52 g of ammonium molybdate (0.000525 mol) were put into a 1 L three-neck round bottom flask, and stirred in alkyl benzene or without a solvent, and heated, followed by reaction at 175 to 200 for 3 to 6 hours. Thereafter, the reactant was cooled by putting 2 L of water thereinto, filtered, and treated with 1 L of 0.35 to 0.5 wt % hydrochloric acid solution and 2 L of 2.5 to 3.0 wt % sodium hydroxide solution, followed by washing. The precipitated metal complex was separated and dried. Results of element analysis of the obtained metal complex were shown in the following Table 2, and near infrared ray absorption and reflectance thereof were shown in FIG. 2.

Among numerical values indicating degrees of absorption or reflection, respectively, reflectance was 16% at 840 nm in near infrared region and 64% at 1200 nm, and a difference in reflectance (ΔR %) was 48%.

TABLE 2

|  | C | H | N | O | Mo | Mg |
|---|---|---|---|---|---|---|
| Calculated value | 66.0 | 2.8 | 19.3 | 3.7 | 5.5 | 2.8 |
| Measured value | 63.5 | 3.3 | 18.6 | 4.4 | 4.8 | 2.7 |

After preparation, at the time of treating the reactant with acid and base in order to obtain μ-polyoxo crosslinked molybdenum-magnesium phthalocyanine compound, which is a hetero-metal phthalocyanine compound, contents of molybdenum and magnesium were slightly decreased.

Example 3

A μ-polyoxo crosslinked molybdenum phthalocyanine compound including a silicon metal phthalocyanine compound according to the present invention was prepared. To this end, the compound was prepared by the same method as in Example 2 except for using silicon chloride instead of magnesium chloride.

Among numerical values indicating degrees of absorption or reflection, respectively, reflectance of the compound was 18% at 840 nm in near infrared region and 65% at 1200 nm, and a difference in reflectance (ΔR %) was 47%.

Example 4

A μ-polyoxo crosslinked molybdenum phthalocyanine compound including an aluminum metal phthalocyanine compound according to the present invention was prepared. To this end, the compound was prepared by the same method as in Example 2 except for using aluminum chloride instead of magnesium chloride.

Among numerical values indicating degrees of absorption or reflection, respectively, reflectance of the compound was 16% at 840 nm in near infrared region and 62% at 1200 nm, and a difference in reflectance (ΔR %) was 46%.

Example 5

A μ-polyoxo crosslinked molybdenum phthalocyanine compound including a silicon metal phthalocyanine compound according to the present invention was prepared. To this end, the compound was prepared by the same method as in Examples 2 and 3 except for using phthalic anhydride corresponding to the case in which $A^1$ was ethyl and $A^2$ to $A^4$ were hydrogen in Chemical Formula III.

Among numerical values indicating degrees of absorption or reflection, respectively, reflectance of the compound was 20% at 840 nm in near infrared region and 62% at 1200 nm, and a difference in reflectance (ΔR %) was 42%.

Example 6

A µ-polyoxo crosslinked molybdenum phthalocyanine compound including an aluminum metal phthalocyanine compound according to the present invention was prepared. To this end, the compound was prepared by the same method as in Examples 2 to 4 except for using phthalic anhydride corresponding to the case in which $A^1$ was propyl and $A^2$ to $A^4$ were hydrogen in Chemical Formula III.

Among numerical values indicating degrees of absorption or reflection, respectively, reflectance of the compound was 23% at 840 nm in near infrared region and 59% at 1200 nm, and a difference in reflectance (ΔR %) was 36%.

Comparative Example 1

Figure 3:
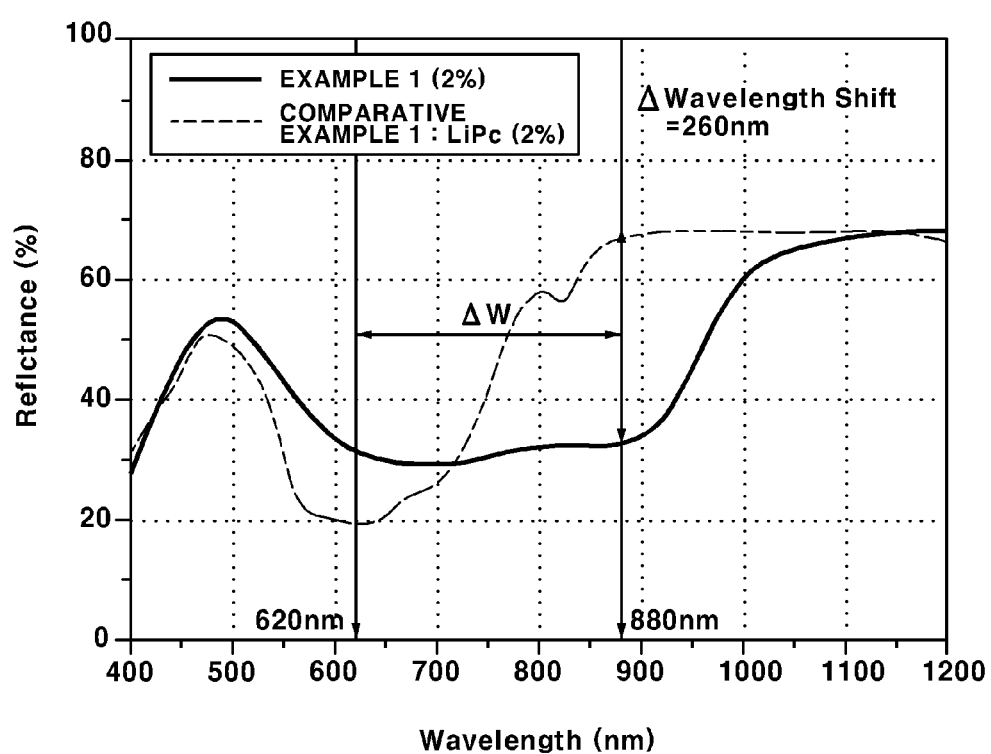
FIGS. 3 to 5 show measurement results of near infrared ray reflectance of a phthalocyanine compound according to Comparative Examples.

Intensities of absorption and reflection of near infrared light in a wavelength region of 400 to 1200 nm were measured and compared with respect to the compound separated and dried in Example 1 and a lithium phthalocyanine compound (Aldrich) having a structure represented by the following Chemical Formula IV, and the result was shown in FIG. 3.

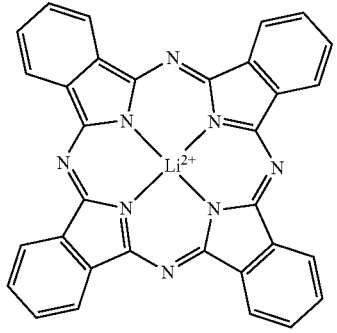

[Chemical Formula IV]

In the case of the lithium phthalocyanine compound having a structure represented by the following Chemical Formula IV, a point of inflection at which the reflectance increases was observed in the vicinity of 620 nm, and absorption was hardly shown at 800 nm or more in near infrared region but reflectance was shown at a level of 70%.

Comparative Example 2

Figure 4:
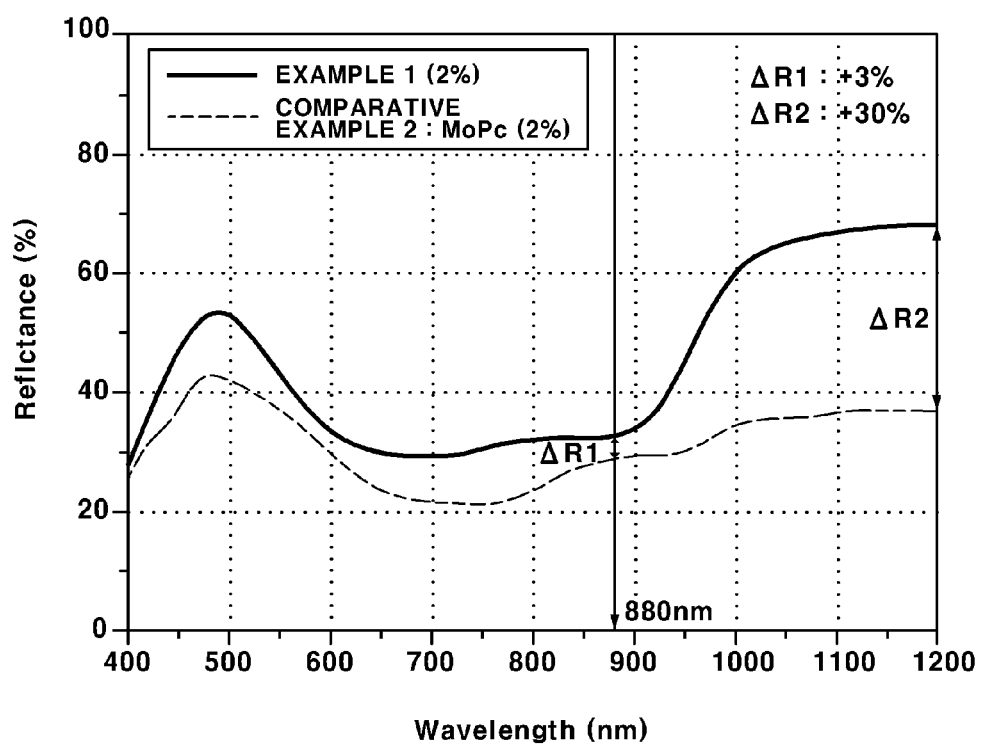

Intensities of absorption and reflection of near infrared light in a wavelength region of 400 to 1200 nm were measured and compared with respect to the compound separated and dried in Example 1 and a molybdenum phthalocyanine compound having a structure represented by the following Chemical Formula V, and the result was shown in FIG. 4.

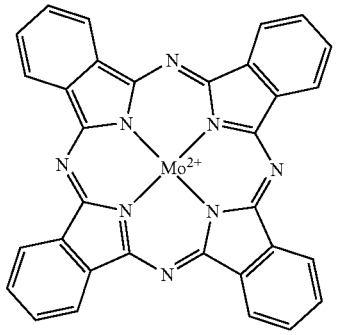

[Chemical Formula V]

In the case of the molybdenum phthalocyanine compound having a structure represented by the following Chemical Formula V, a deformed smooth spectrum was shown from in the vicinity of 750 nm, and absorption was shown even at 800 to 1200 nm or more in near infrared region but a difference in reflectance (ΔR %) was less than 20%.

Comparative Example 3

Figure 5:
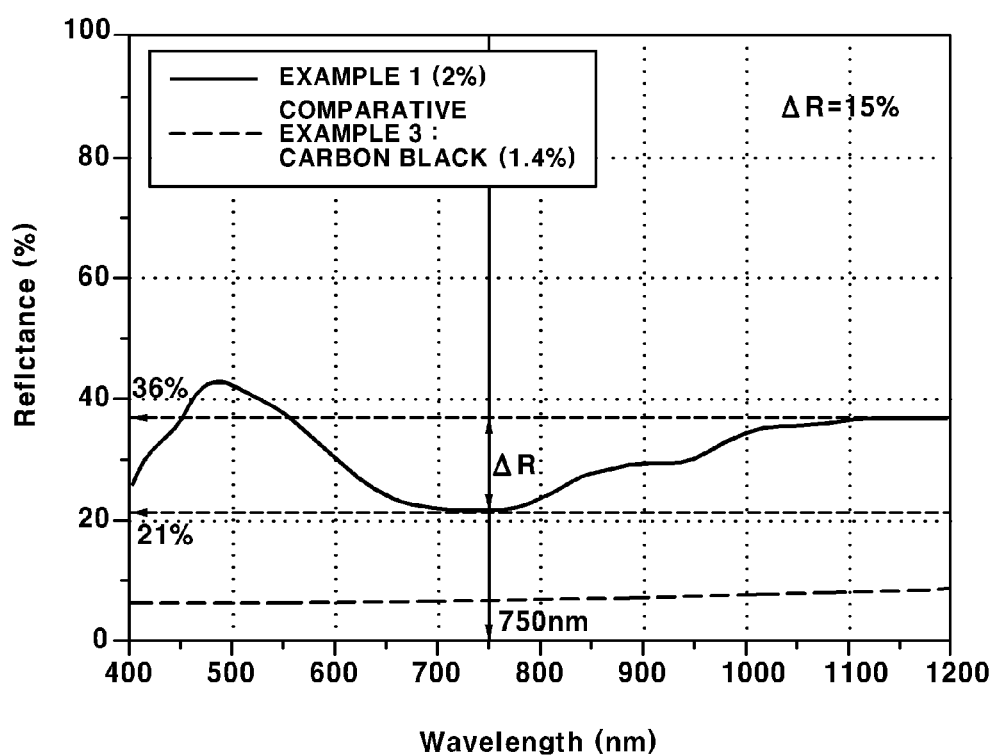

Intensities of absorption and reflection of near infrared light in a wavelength region of 400 to 1200 nm were measured and compared with respect to the compound separated and dried in Example 1 and carbon black (Cabot), and the result was shown in FIG. 5.

Carbon black had high absorption, which is an inherent property of carbon black, in a visible region at 400 nm or more and near infrared region at 800 to 120 nm, but a difference in reflectance (ΔR %) was less than 20%.

Application Example 1

Figure 6:
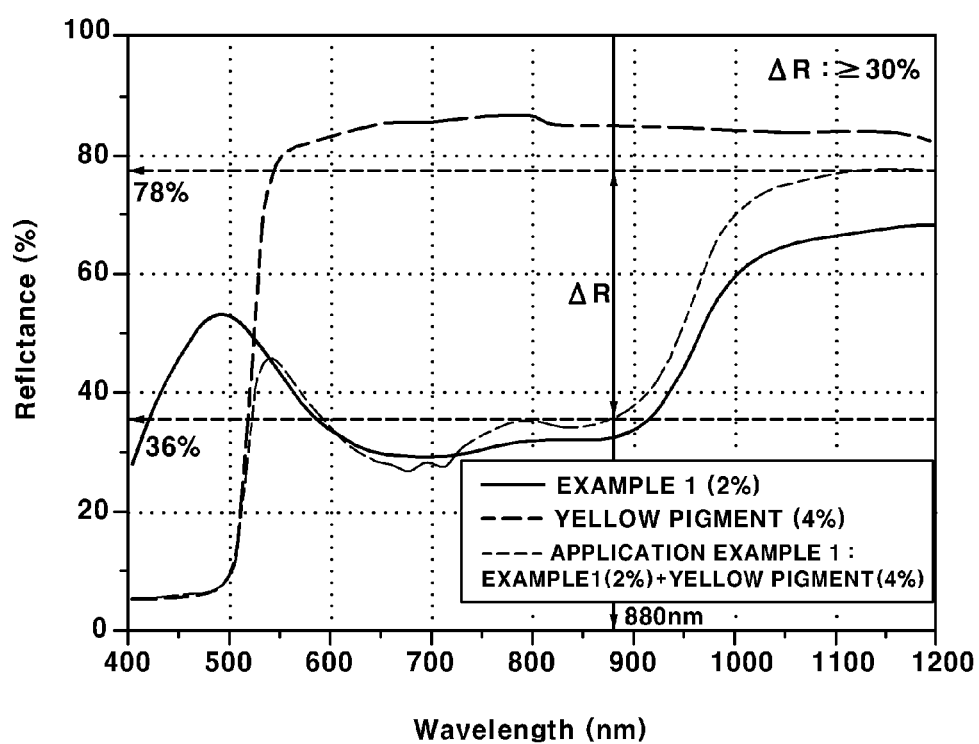
FIGS. 6 to 11 show measurement results of near infrared ray reflectance of a μ-polyoxo crosslinked molybdenum phthalocyanine compound according to Application Examples of the present invention.

Intensities of absorption and reflection of near infrared light in a wavelength region of 400 to 1200 nm were measured and compared with respect to the compound separated and dried in Example 1, a general yellow pigment, and a yellow pigment to which the compound was applied, and the result was shown in FIG. 6.

Among numerical values indicating degrees of absorption or reflection of the yellow pigment to which the compound in Example 1 was applied, reflectance of the yellow pigment was 36% at 880 nm in near infrared region and 78% at 1200 nm, and a difference in reflectance (ΔR %) was 42%.

Application Example 2

Figure 7:
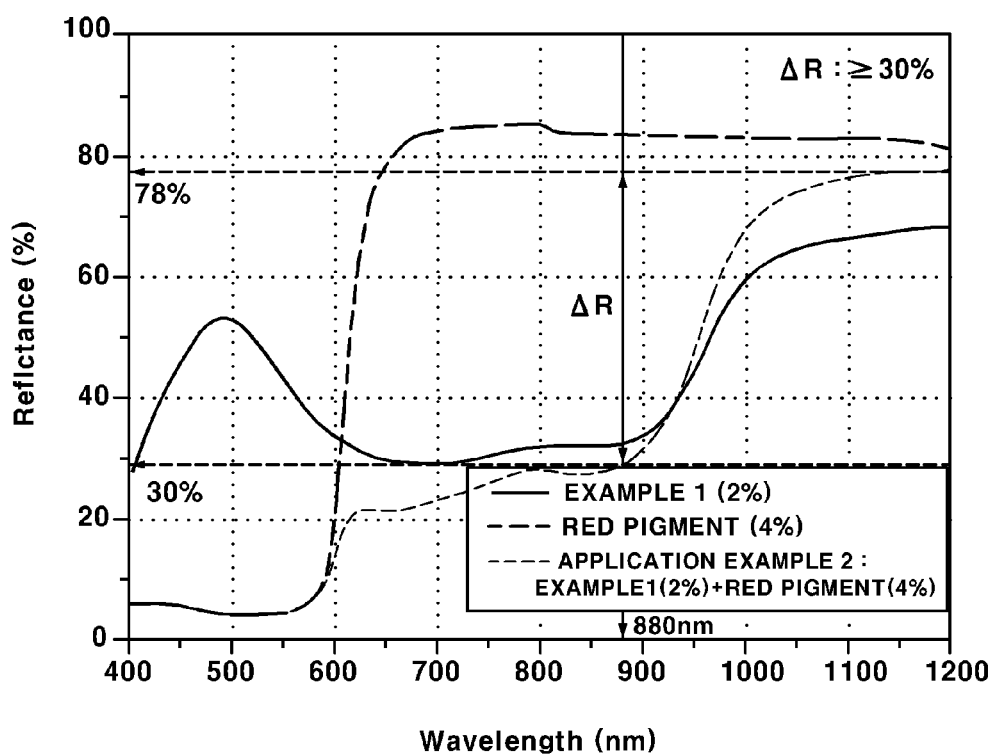

Intensities of absorption and reflection of near infrared light in a wavelength region of 400 to 1200 nm were measured and compared with respect to the compound separated and dried in Example 1, a general red pigment, and a red pigment to which the compound was applied, and the result was shown in FIG. 7.

Among numerical values indicating degrees of absorption or reflection of the red pigment—to which the compound in Example 1 was applied, reflectance of the red pigment was 30% at 880 nm in near infrared region and 78% at 1200 nm, and a difference in reflectance (ΔR %) was 48%.

Application Example 3

Figure 8:
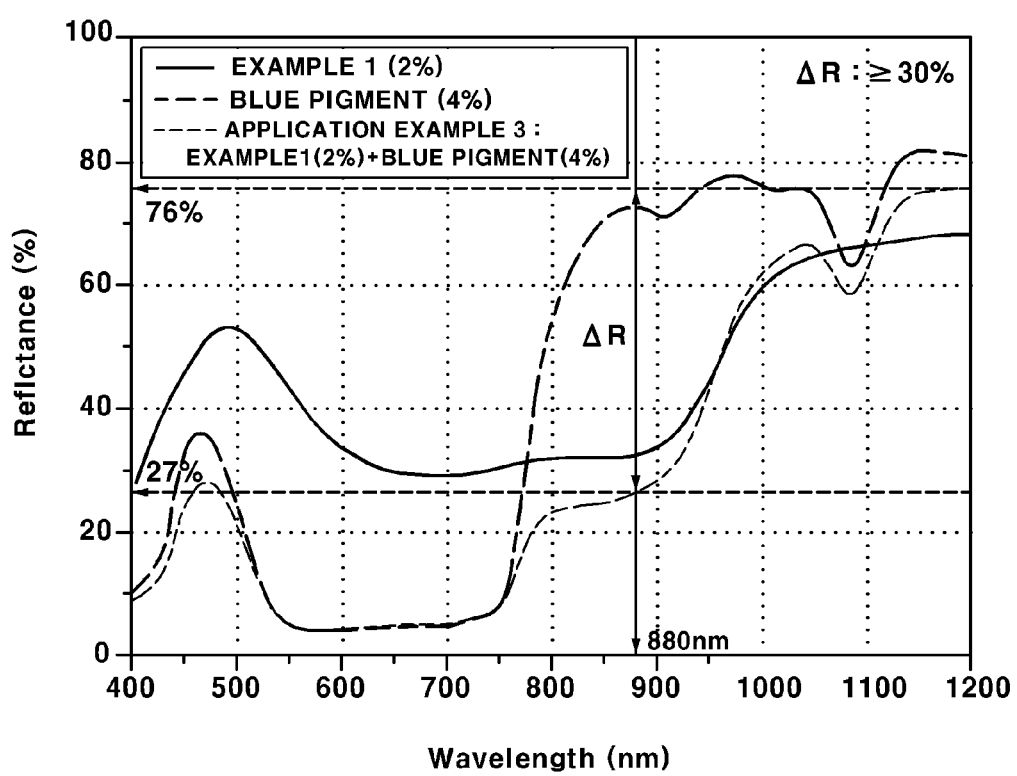

Intensities of absorption and reflection of near infrared light in a wavelength region of 400 to 1200 nm were measured and compared with respect to the compound separated and dried in Example 1, a general blue pigment, and a blue pigment to which the compound was applied, and the result was shown in FIG. 8.

Among numerical values indicating degrees of absorption or reflection of the blue pigment to which the compound in Example 1 was applied, reflectance of the blue pigment was 27% at 880 nm in near infrared region and 76% at 1200 nm, and a difference in reflectance (ΔR %) was 49%.

Application Example 4

Figure 9:
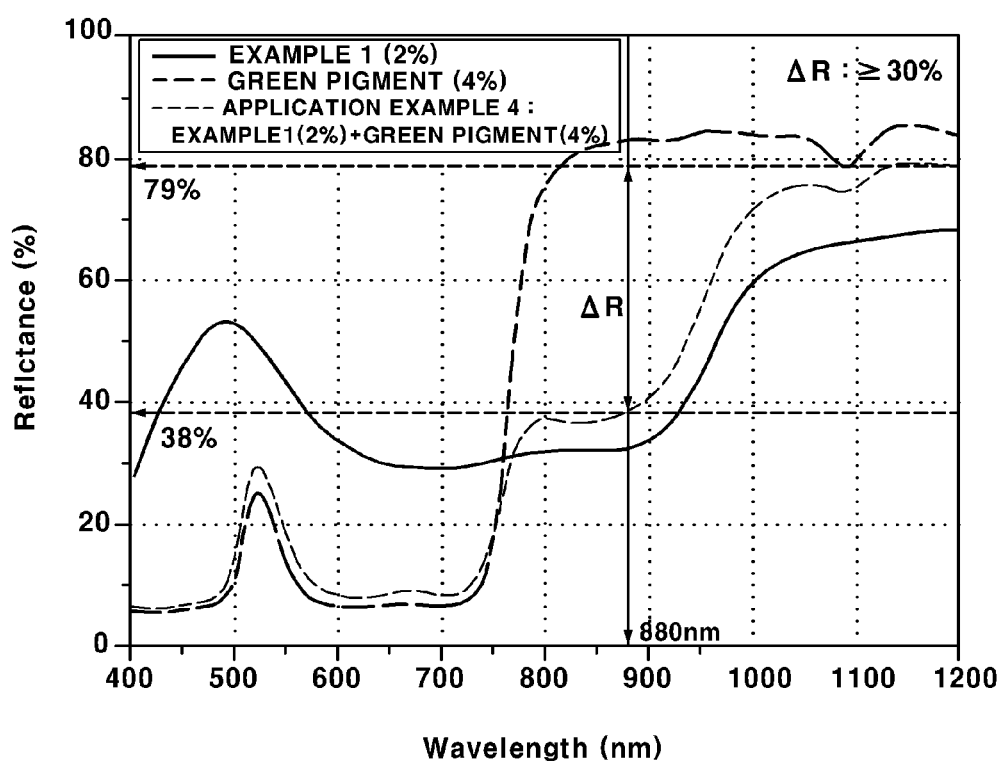

Intensities of absorption and reflection of near infrared light in a wavelength region of 400 to 1200 nm were measured and compared with respect to the compound separated and dried in Example 1, a general green pigment, and a green pigment to which the is compound was applied, and the result was shown in FIG. 9.

Among numerical values indicating degrees of absorption or reflection of the green dye to which the compound in Example 1 was applied, reflectance of the green dye was 38% at 880 nm in near infrared region and 79% at 1200 nm, and a difference in reflectance (ΔR %) was 41%.

Application Example 5

Figure 10:
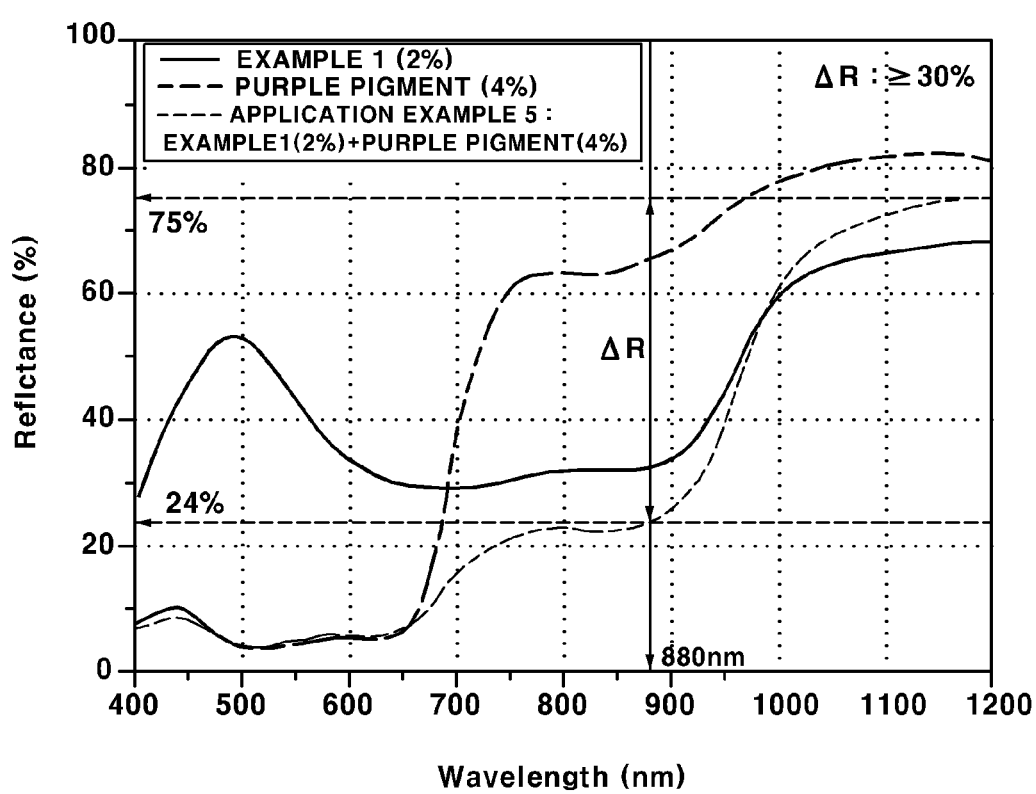

Intensities of absorption and reflection of near infrared light in a wavelength region of 400 to 1200 nm were measured and compared with respect to the compound separated and dried in Example 1, a general purple pigment, and a purple pigment to which the compound was applied, and the result was shown in FIG. 10.

Among numerical values indicating degrees of absorption or reflection of the purple pigment to which the compound in Example 1 was applied, reflectance of the purple pigment was 24% at 880 nm in near infrared region and 75% at 1200 nm, and a difference in reflectance (ΔR %) was 51%.

Application Example 6

Figure 11:
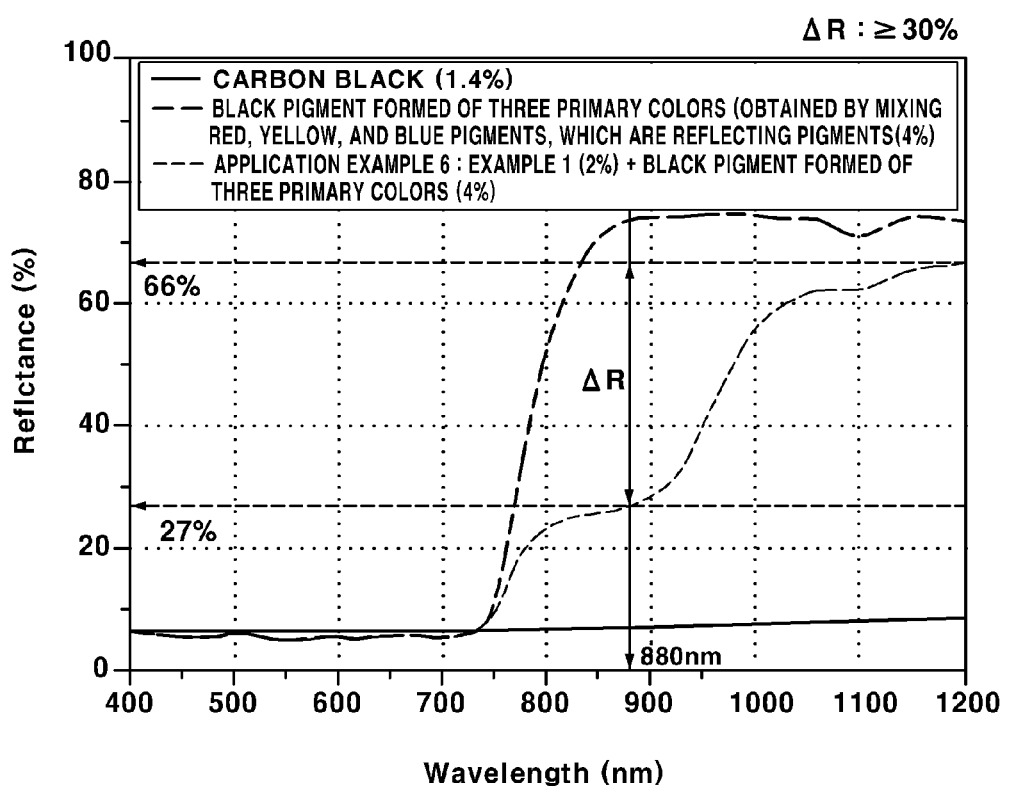

Intensities of absorption and reflection of near infrared light in a wavelength region of 400 to 1200 nm were measured and compared with respect to carbon black (absorption pigment), a black pigment formed of three primary colors (black pigment formed by mixing red, yellow, and blue pigments, which are reflecting pigments), a black pigment composed of three primary colors and including the compound (2%) separated and dried in Example 1, and the result was shown in FIG. 11.

Based on the reflectance among numerical values indicating degrees of absorption or reflection, respectively, reflectance was low at 880 nm in near infrared region and high at 1200 nm, and a difference in reflectance (ΔR %) was shown in the following Table 3.

In addition, an absorption property at 880 nm and a reflection property at 1200 nm or more may be confirmed by the naked eye using a near infrared light source (near infrared LED at 800 to 1200 nm) and a charge-coupled device (CCD) camera apparatus component.

TABLE 3

|  | Carbon black (1.4%) | Black formed of three primary colors (4%) | Example 1 (2%) + Black formed of three primary colors (4%) |
|---|---|---|---|
| Reflectance at 880 nm (R %) | 7 | 74 | 27 |
| Reflectance at 1200 nm (R %) | 8.5 | 74 | 66 |
| Difference in reflectance (ΔR %) | 1.5 | 0 | 39 |

According to the results of Application Examples 1 to 6, in the cases of the blue and green pigments among the general color pigments, a change in absorption of near infrared light in a wavelength region of 700 to 800 nm was confirmed. This indicates that since in most of the common near infrared ray absorbers, a change in absorption of near infrared light was shown in a wavelength region of 700 to 800 nm, absorption spectra thereof were overlapped with those of the blue and green color pigments, such that it is impossible to use the common near infrared ray absorbers together with the blue and green pigments.

The μ-polyoxo crosslinked molybdenum phthalocyanine compound according to the present invention has high absorption in a wavelength region of 800 to 950 nm and high reflectance in a wavelength region of 1200 nm or more, and in the case of mixing the μ-polyoxo crosslinked molybdenum phthalocyanine compound with a color pigment, various colors which it is difficult to use together with the near infrared ray absorber according to the related art such as a blue color, a green color, and the like, may be implemented.

According to the exemplary embodiment of the present invention, there is provided a μ-polyoxo crosslinked molybdenum phthalocyanine compound capable of absorbing and reflecting near infrared ray at the same time. Since the compound has high thermal stability, the compound may stably exhibit optimal performance at a high processing temperature. In addition, the compound has improved light fastness and a wide near infrared ray absorbing and reflecting wavelength region as compared to commercialized products according to the related art, such that the compound may be applied in various fields.

Although the embodiments of the present invention has been described in detail, those skilled in the art will appreciate that the present invention may be variously modified and changed by supplements, modifications, deletions, or additions of components, without departing from the scope and spirit of the invention as disclosed in the accompanying claims. Accordingly, such supplements, modifications, deletions, or additions should also be understood to fall within the scope of the present invention.

What is claimed is:

1. A μ-polyoxo crosslinked molybdenum phthalocyanine compound comprising:
   at least one non-metal phthalocyanine,
   wherein it has a structure represented by following Chemical Formula I;

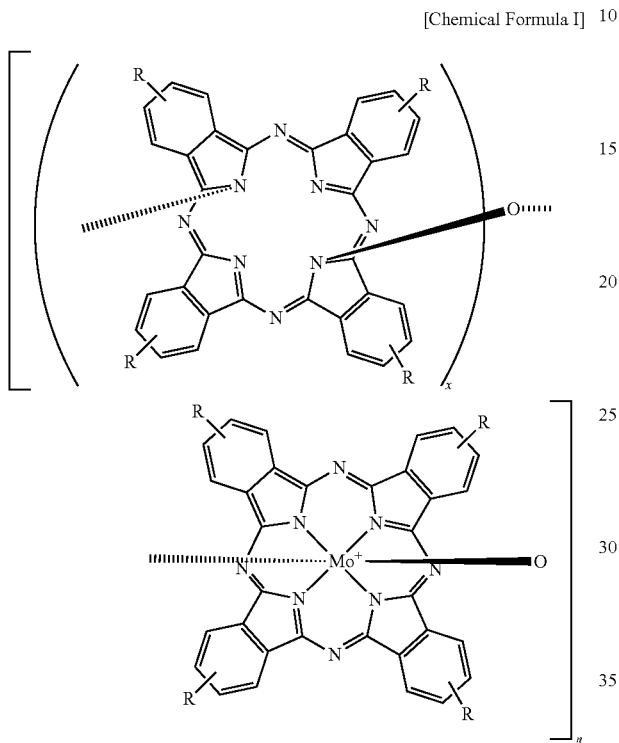

[Chemical Formula I]

where,
R is selectively substituted with a substituent independently selected from the group consisting of hydrogen, halogen, hydroxyl, amino, sulfonyl, hydroxysulfonyl, aminosulfonyl, $(C_1-C_5)$alkyl, $SR^{17}$, $OR^{18}$ and $NHR^{19}$;
$R^{17}$ to $R^{19}$ are each independently selected from the group consisting of $(C_1-C_5)$alkyl, $(C_1-C_5)$alkoxy and phenyl selectively substituted with a substituent independently selected from the group consisting of halogen, hydroxyl, amino, sulfonyl, hydroxysulfonyl, aminosulfonyl, $(C_1-C_5)$alkyl and $(C_1-C_5)$alkoxy;
x is a rational number of 0.001 to 1; and
n is an integer of 1 to 20.

2. The μ-polyoxo crosslinked molybdenum phthalocyanine compound of claim 1, wherein it absorbs near infrared ray at a wavelength of 800 to 950 nm and reflects near infrared ray at a wavelength of 1200 nm or more.

3. The μ-polyoxo crosslinked molybdenum phthalocyanine compound of claim 1, wherein a difference between absorption of near infrared ray at a wavelength of 800 to 950 nm and reflectance of near infrared ray at a wavelength of 1200 nm or more is 30% or more.

4. A preparing method of the μ-polyoxo crosslinked molybdenum phthalocyanine compound of claim 1, the preparing method comprising: oxo crosslinking at least one non-metal phthalocyanine and phthalocyanine substituted with a molybdenum metal to each other.

5. A near infrared ray absorbing and reflecting composition comprising:
   the μ-polyoxo crosslinked molybdenum phthalocyanine compound of claim 1; and
   at least one binder selected from the group consisting of an acrylic polymer, an alkyd resin, polyamide, polyurethane, polyester, polyethylene terephthalate, polycarbonate and polypropylene.

6. An optical equipment comprising:
   a printing layer containing the compound of claim 1 or the composition of claim 5, absorbing near infrared ray at a wavelength of 800 to 950 nm, and reflecting near infrared ray at a wavelength of 1200 nm or more; and
   a reflecting layer on the printing layer.

7. A μ-polyoxo crosslinked molybdenum phthalocyanine compound comprising:
   one different kind—metal phthalocyanine, wherein the different kind—metal is selected from the group consisting of nickel, lithium, magnesium, silicon and aluminum,
   wherein it has a structure represented by following Chemical Formula II;

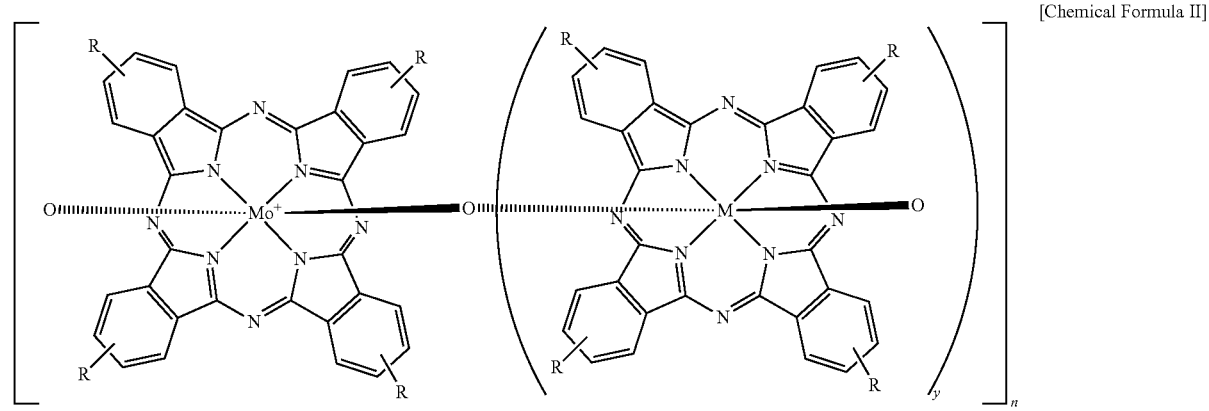

[Chemical Formula II]

where,
R is selectively substituted with a substituent independently selected from the group consisting of hydrogen, halogen, hydroxyl, amino, sulfonyl, hydroxysulfonyl, aminosulfonyl, $(C_1-C_5)$alkyl, $SR^{17}$, $OR^{18}$ and $NHR^{19}$;
$R^{17}$ to $R^{19}$ are each independently selected from the group consisting of $(C_1-C_5)$alkyl, $(C_1-C_5)$alkoxy and phenyl selectively substituted with a substituent independently selected from the group consisting of halogen, hydroxyl, amino, sulfonyl, hydroxysulfonyl, aminosulfonyl, ($C_1$-$C_5$)alkyl and ($C_1$-$C_5$)alkoxy;

M is selected from the group consisting of nickel, lithium, magnesium, silicon, aluminum, an oxide thereof and a halide thereof, wherein nickel, lithium, magnesium, silicon and aluminum are capable of having a valence of 1 to 4;

y is a rational number of 0.001 to 2; and n is an integer of 1 to 20.

8. The µ-polyoxo crosslinked molybdenum phthalocyanine compound of claim 7, wherein it absorbs near infrared ray at a wavelength of 800 to 950 nm and reflects near infrared ray at a wavelength of 1200 nm or more.

9. The µ-polyoxo crosslinked molybdenum phthalocyanine compound of claim 7, wherein a difference between absorption of near infrared ray at a wavelength of 800 to 950 nm and reflectance of near infrared ray at a wavelength of 1200 nm or more is 30% or more.

10. A preparing method of the µ-polyoxo crosslinked molybdenum phthalocyanine compound of claim 7, the preparing method comprising:

oxo crosslinking at least one different kind—metal phthalocyanine and phthalocyanine substituted with a molybdenum metal to each other, wherein the different kind—metal is selected from the group consisting of nickel, lithium, magnesium, silicon and aluminum.

11. A near infrared ray absorbing and reflecting composition comprising:

the µ-polyoxo crosslinked molybdenum phthalocyanine compound of claim 7; and at least one binder selected from the group consisting of an acrylic polymer, an alkyd resin, polyamide, polyurethane, polyester, polyethylene terephthalate, polycarbonate and polypropylene.

12. An optical equipment comprising:

a printing layer containing the compound of claim 5 or the composition of claim 11, absorbing near infrared ray at a wavelength of 800 to 950 nm, and reflecting near infrared ray at a wavelength of 1200 nm or more; and a reflecting layer on the printing layer.

* * * * *